Feb. 12, 1924.
G. B. COLEMAN
1,483,281
METHOD AND APPARATUS FOR TRANSFORMING DIRECT CURRENT
Filed Oct. 16, 1919    2 Sheets-Sheet 1
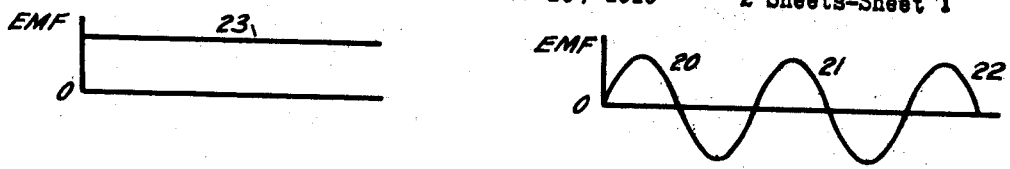
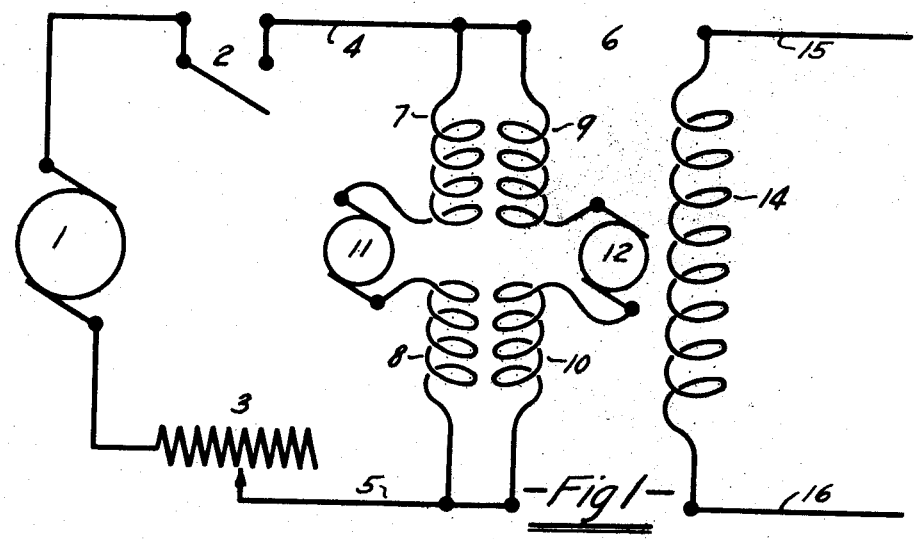
—Fig 1—
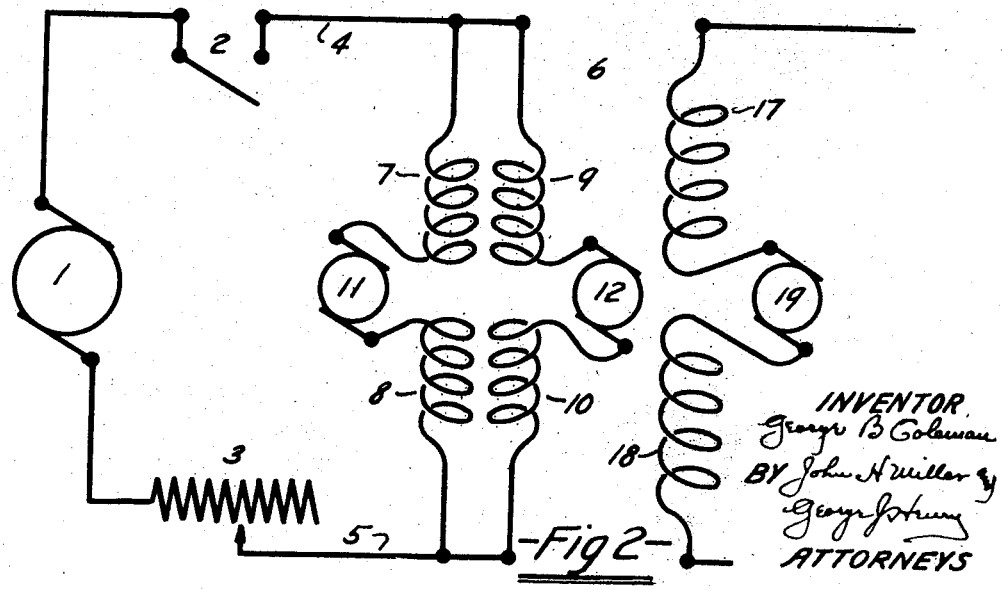
—Fig 2—
INVENTOR
George B Coleman
BY John H Miller &
George J Henry
ATTORNEYS Feb. 12, 1924.
G. B. COLEMAN
1,483,281
METHOD AND APPARATUS FOR TRANSFORMING DIRECT CURRENT
Filed Oct. 16, 1919    2 Sheets-Sheet 2
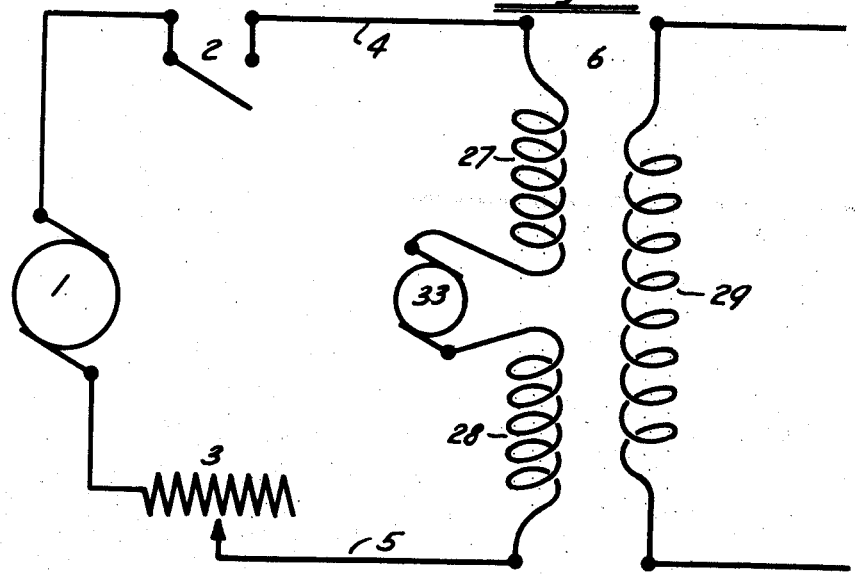

Patented Feb. 12, 1924.

1,483,281

UNITED STATES PATENT OFFICE.

GEORGE B. COLEMAN, OF SAN FRANCISCO, CALIFORNIA, ASSIGNOR TO COLEMAN X-RAY COMPANY, OF SAN FRANCISCO, CALIFORNIA, A CORPORATION OF CALIFORNIA.

METHOD AND APPARATUS FOR TRANSFORMING DIRECT CURRENT.

Application filed October 16, 1919. Serial No. 331,034.

*To all whom it may concern:*

Be it known that I, GEORGE B. COLEMAN, a citizen of the United States, and a resident of the city and county of San Francisco, State of California, have invented new and useful Improvements in Methods and Apparatus for Transforming Direct Current, of which the following is a specification.

My invention has for its object the production of a secondary current of any desired voltage from a direct current primary, and includes the production of either an induced unidirectional or of an alternating current, depending upon the means and manner of employment, as set forth fully in the accompanying figures and specifications.

In Fig. 1 I have shown diagrammatically a primary direct current circuit and a secondary, or induced, alternating current circuit, with the transformer windings and a diagrammatic showing of my rectifier or selector in combination therewith.

Fig. 2 is a diagrammatic showing of a primary circuit having an impressed direct electromotive force, and an induced direct current secondary circuit with my rectifying or selecting means interposed in the transformer circuit.

Fig. 3 shows diagrammatically a primary circuit, having an impressed direct electromotive force, and an induced secondary direct electromotive force.

Fig. 4 indicates diagrammatically on the shaft of my rectifier the two adjacent commutators and brushes for the primary transformer coils of Figures 1 and 2.

Fig. 5 shows the arrangement of the commutator for the rectifier on the secondary winding of Fig. 2 with its relative position to the commutator segments of Fig. 4.

Fig. 6 shows the arrangement of the commutator segments in the rectifier as applicable to the apparatus shown in Fig. 3.

With each Figure 1, 2, 3, is shown the curve of impressed electromotive force in the transformer primary and the corresponding derived wave of the secondary circuit.

Throughout the figures like numerals refer to similar parts.

A source of direct current is indicated, as by the generator 1, connected through a switch 2, and rheostat device 3, and the circuit 4, 5; within which is the primary winding of the transformer 6. This primary winding consists of two coils wound in opposite directions, each of which is divided at its neutral, or central, point, thus consisting in effect of four coils 7, 8; 9, 10. The division between 7 and 8, and between 9 and 10 is provided with a "make" and "break" device 11 and 12 respectively.

In Figure 4 I have shown diagrammatically the arrangement of the commutator segments 11, 12, on the shaft 13 by which it will be seen that in the positions of the commutators shown, the circuit will be complete through the coils 7 and 8, and when the shaft 13 has rotated sufficiently the circuit will be interrupted between 7 and 8, and will have been completed between 9 and 10. The rotation of the shaft 13 will therefore cause a current to alternate between the two primary windings of the transformer 6, such that the excitation of 7, 8, will alternate with the excitation of 9, 10. These windings being wound in opposite directions, there will be produced an alternating primary excitation in the transformer 6, which will result in an alternating derived electromotive force in the secondary winding 14, and therefore in the secondary circuit 15, 16, which may be employed for any useful purpose.

The frequency of the derived alternating electromotive force will correspond with the frequency of alternations in the primary occasioned by the revolution of the shaft 13, and "making" and "breaking" of the conductivity of the primary windings; and the shaft 13 may be advantageously operated from a motor in circuit with the secondary 14.

In Fig. 2 the same form of interrupter (as shown in Fig. 4) is used in the primary windings, and on the shaft 13 thereof I mount the additional commutator 19, as shown in Fig. 5, interposed at the central point of the transformer secondary winding 17, 18, and which is adapted to operate "in step" with 11 and 12, and by its action to complete the conductivity of 17, 18, during the conduction period of one of the primary windings as 7, 8, and to interrupt said conductivity between 7, 8, during the conductivity of 9, 10.

It will thus be seen that by the arrangement set forth in Fig. 1 we are deriving an alternating current from the transformer secondary, the primary windings of which transformer are energized from a direct current source, whereas, with the arrangement as shown in Fig. 2 we are deriving uni-direction current, as indicated at 24, 25, 26, from the secondary winding of the transformer, the primary windings of which transformer are energized from a direct current source.

In Fig. 3 the transformer 6 is provided with a primary coil 27, 28, divided at its central point, having interposed therein a periodic interrupter 33 adapted to alternately complete and to interrupt the conductivity between 27, 28 to accomplish the wave form as shown at 30, 31, 32. The secondary winding 29 is herein energized during the periods of conductivity between 27 and 28, and will consequently deliver a series of uni-direction current waves as 30, 31, 32.

The impressed energization from the direct current source 1 is shown by the broken line 24, wherein the spaces between the lines correspond with the interruptions in the conductivity between 27 and 28, occasioned by the commutator at 33.

In Fig. 2 the same form of interrupter as shown in Fig. 4 is used in the primary windings, and on the shaft 13 thereof I mount the additional commutator 19 as shown in Fig. 5 interposed at the central point of the transformer secondary windings 17, 18, and which is adapted to operate in step with 11 and 12, and by its action to complete the conductivity of 17, 18, during the conductive period of one of the primary windings as 7, 8, and to interrupt said conductivity during the conductivity of 9, 10.

The derived wave from the winding 17, 18 will then be as shown in Fig. 2 at 24, whereas the impressed wave from the source 1 would be represented by a straight line 23.

The application of my interrupter in the circuit of the transformer windings and substantially at the central point thereof, is for the purpose of interrupting the current at a point of reduced voltage and therefore said interruption is retained relatively free from sparking and a transformed wave of different form in the secondary from that of the primary, or vice versa, is attained with a minimum of moving parts; and with the most economical and reliable construction.

Reference is herein made to my co-pending applications Serial Numbers 327,513, filed Sept. 30, 1919; 331,033, filed Oct. 16, 1919; 344,101, filed Dec. 11, 1919; 361,584, filed Feb. 26, 1920.

I claim:

1. In a transformation system a primary winding adapted to energization by a direct current, said winding divided at an intermediate point, and a secondary winding from which an induced current is derived, in combination with a device connected to the intermediate terminals of the primary winding adapted to periodically interrupt and complete the circuit of the said primary winding.

2. In a transformation system a primary winding adapted to energization by a direct current, said winding divided at its intermediate point, and a secondary winding from which the induced current is derived, in combination with a device connected to the divided intermediate ends of the primary winding constructed and adapted to periodically interrupt and complete the circuit of the said primary winding, said interruptions timed to correspond with the period of magnetization and demagnetization of the transformer core.

3. In a transformer, a pair of oppositely wound primary windings connected in parallel and divided at intermediate points of each and having interposed at the point of division means constructed and adapted to alternately complete the circuit through one of said primary windings and interrupt the circuit of the other primary winding; and a secondary winding.

4. In a transformer, a pair of oppositely wound primary windings connected in parallel and divided at intermediate points of each and having interposed at the point of division means constructed and adapted to alternately complete the circuit through one of said primary windings and interrupt the circuit of the other primary winding, said interruptions timed to correspond with the period of magnetization and demagnetization of the transformer core.

5. In a transformer, a pair of oppositely wound primary windings connected in parallel and divided at intermediate points of each and having interposed at the point of division means constructed and adapted to alternately complete the circuit through one of said primary windings and interrupt the circuit of the other primary winding, said secondary divided at its intermediate point and provided with means constructed and adapted to "make" and "break" the circuit of said secondary at periods coincident with the zero value of the induced electromotive force wave.

6. In a transformation system a primary winding and a secondary winding and interrupting means interposed in said primary winding substantially at an intermediate point thereof, and other interrupting means interposed in said secondary winding substantially at an intermediate point thereof.

7. The method of transforming a direct current impressed on the primary winding of a transformer from which a derived current is obtained, which consists of periodically interrupting said impressed current and also interrupting the derived current at the same interrupting frequency as the impressed current interruption.

8. The method of deriving an interrupted secondary current from an impressed primary current which consists of interrupting the primary circuit and also the secondary circuit, wherein the said interruptions are of like frequency.

9. The method of transforming a direct current in a transformer having a primary and secondary winding which consists of interrupting the said primary winding periodically at an intermediate point thereof and also interrupting the secondary winding at an intermediate point thereof.

10. The method of transforming a direct current in a transformer having a primary and secondary winding which consists of interrupting the said primary winding periodically at an intermediate point thereof and also interrupting the secondary winding at an intermediate point thereof, with the same frequency as the first mentioned interruption.

In testimony whereof, I have hereunto set my hand at San Francisco, California, this 9th day of October, 1919.

GEORGE B. COLEMAN.

In presence of—
C. B. SMITH,
H. GUYER.